(12) United States Patent
Kudoh et al.

(10) Patent No.: US 10,185,259 B2
(45) Date of Patent: Jan. 22, 2019

(54) ENDLESS BELT, FIXING DEVICE, IMAGE FORMING APPARATUS, AND METHOD OF MANUFACTURING ENDLESS BELT

(71) Applicants: Yuzuru Kudoh, Kanagawa (JP); Hiroyuki Endo, Kanagawa (JP); Tetsushi Aimi, Kanagawa (JP)

(72) Inventors: Yuzuru Kudoh, Kanagawa (JP); Hiroyuki Endo, Kanagawa (JP); Tetsushi Aimi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/452,208

(22) Filed: Mar. 7, 2017

(65) Prior Publication Data
US 2017/0269520 A1    Sep. 21, 2017

(30) Foreign Application Priority Data

Mar. 18, 2016  (JP) .................................. 2016-056031
Jan. 12, 2017  (JP) .................................. 2017-003505

(51) Int. Cl.
  *G03G 15/20*   (2006.01)
  *B29D 29/00*   (2006.01)
  *B23K 26/36*   (2014.01)

(52) U.S. Cl.
  CPC ......... *G03G 15/2053* (2013.01); *B23K 26/36* (2013.01); *B29D 29/00* (2013.01); *G03G 15/2057* (2013.01); *G03G 2215/2025* (2013.01); *G03G 2215/2035* (2013.01)

(58) Field of Classification Search
  CPC ........... G03G 15/2053; G03G 15/0216; G03G 15/0233; G03G 15/0806; G03G 15/0818; G03G 15/1605; G03G 15/162; G03G 15/754; G03G 21/0041; G03G 2215/00139; G03G 2215/1623; G03G 2215/2009; G03G 2215/2016; G03G 2215/2035; B23K 26/36; B23K 2201/16; B29D 29/00; B29D 29/06
  USPC ....... 399/162, 174, 278, 288, 302, 303, 313, 399/329, 333, 352; 198/804, 844.1; 264/139, 145, 342 R, 342 RE; 428/192
  See application file for complete search history.

(56) References Cited

U.S. PATENT DOCUMENTS

| | | | | |
|---|---|---|---|---|
| 3,533,692 | A | * 10/1970 | Blanchette | G03G 5/10 399/116 |
| 4,831,393 | A | * 5/1989 | Dean, II | G03G 15/754 347/152 |
| 5,418,349 | A | * 5/1995 | Swain | B23K 26/1464 134/1 |

(Continued)

FOREIGN PATENT DOCUMENTS

| | | | | |
|---|---|---|---|---|
| JP | 57129451 | A * | 8/1982 | ............. G03G 15/75 |
| JP | 05249852 | A * | 9/1993 | |

(Continued)

*Primary Examiner* — Robert Beatty
(74) *Attorney, Agent, or Firm* — Oblon, McClelland, Maier & Neustadt, L.L.P.

(57) ABSTRACT

An endless belt includes a base layer and a resin layer. The base layer includes a metal film. The resin layer is laminated on an outer side of the base layer. The resin layer includes edge portions in an axial direction with at least one edge portion of the edge portions made narrower than the base layer in the axial direction such that the outer side of the base layer is exposed.

10 Claims, 7 Drawing Sheets

(56) References Cited

U.S. PATENT DOCUMENTS

| | | | | |
|---|---|---|---|---|
| 8,190,075 B2 * | 5/2012 | Baba | ............... | G03G 15/206 |
| | | | | 399/329 |
| 2002/0028317 A1 * | 3/2002 | Sakuma | ............ | D21F 3/0227 |
| | | | | 428/157 |
| 2008/0026208 A1 * | 1/2008 | Katabami | ............ | B29D 29/00 |
| | | | | 428/336 |
| 2012/0155912 A1 * | 6/2012 | Hayase | ............ | G03G 15/2053 |
| | | | | 399/90 |
| 2014/0241771 A1 | 8/2014 | Endo et al. | | |
| 2014/0328610 A1 | 11/2014 | Fujie et al. | | |
| 2016/0170352 A1 | 6/2016 | Endo et al. | | |
| 2016/0209780 A1 * | 7/2016 | Matsushima | ....... | G03G 15/162 |

FOREIGN PATENT DOCUMENTS

| | | | | |
|---|---|---|---|---|
| JP | 2000029235 A | * | 1/2000 | |
| JP | 2000338797 A | * | 12/2000 | |
| JP | 2003-307955 | | 10/2003 | |
| JP | 2004086083 A | * | 3/2004 | |
| JP | 2004-302390 | | 10/2004 | |
| JP | 2005059588 A | * | 3/2005 | |
| JP | 2006-189794 | | 7/2006 | |
| JP | 2009162803 A | * | 7/2009 | |
| JP | 2011-075816 | | 4/2011 | |
| JP | 2011075816 A | * | 4/2011 | |
| JP | 2012-113175 | | 6/2012 | |
| JP | 2014-194522 | | 10/2014 | |

* cited by examiner

ENDLESS BELT, FIXING DEVICE, IMAGE FORMING APPARATUS, AND METHOD OF MANUFACTURING ENDLESS BELT

CROSS-REFERENCE TO RELATED APPLICATIONS

This patent application is based on and claims priority pursuant to 35 U.S.C. § 119 to Japanese Patent Applications Nos. 2016-056031, filed on Mar. 18, 2016, and 2017-003505, filed on Jan. 12, 2017 in the Japan Patent Office, the entire disclosures of which are hereby incorporated by reference herein.

BACKGROUND

Technical Field

Exemplary aspects of the present disclosure relate to an endless belt, a fixing device, an image forming apparatus, and a method of manufacturing the endless belt.

Related Art

Fixing devices used in image forming apparatuses generally fix toner on a recording medium by using pressure and heat applied by a pressure unit such as a pressure roller and a fixing belt rotated with the pressure unit. Such a fixing belt is constructed of a resin layer laminated on an outer side of a metal base layer. The resin layer includes an elastic layer made of an elastic material, such as silicone rubber, and a release layer made of a slide material such as fluorine resin.

A method of manufacturing in which an elastic layer closely contacts a base layer has been proposed as a method of manufacturing such a fixing belt.

SUMMARY

In at least one embodiment of this disclosure, there is provided an improved endless belt that includes a base layer and a resin layer. The base layer includes a metal film. The resin layer is laminated on an outer side of the base layer. The resin layer includes edge portions in an axial direction with at least one of the edge portions made narrower than the base layer in the axial direction such that an outer side of the base layer is exposed.

Further provided is an improved fixing device that includes a fixing belt, a heater, and a pressure roller. The fixing belt includes a base layer and a resin layer. The base layer includes a metal film, and the resin layer is laminated on an outer side of the base layer and including edge portions in an axial direction with at least one edge portion of the edge portions made narrower than the base layer in the axial direction such that the outer side of the base layer is exposed. The healer heats the fixing bell, and the pressure roller rotates with the fixing belt to press against a recording medium.

Further provided is an improved image forming apparatus that includes an image forming unit and the fixing device described above. The image forming unit forms a toner image on a recording medium, and the fixing device fixes the loner image on the recording medium.

Further provided is an improved method of manufacturing an endless belt. The method includes laminating, cutting, and shortening. A resin layer on an outer side of a base layer including a metal film is laminated. Edge portions of the base layer and the resin layer in an axial direction of the endless belt are cut with a cutter. At least one edge portion of the edge portions of the resin layer is made narrower than the base layer in the axial direction such that the outer side of the base layer is exposed.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
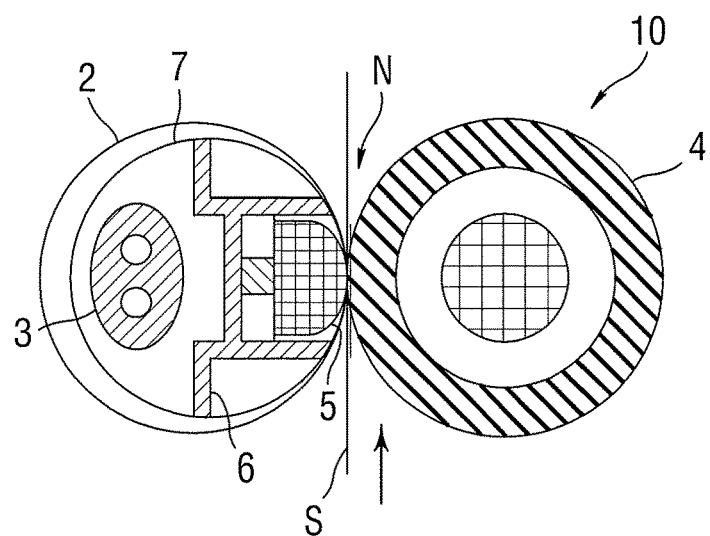
FIG. 1 is a sectional view illustrating a fixing device including an endless belt according to an exemplary embodiment.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner and achieve similar results.

Although the exemplary embodiments are described with technical limitations with reference to the attached drawings, such description is not intended to limit the scope of the disclosure and all of the components or elements described in the exemplary embodiments of this disclosure are not necessarily indispensable.

Referring now to the drawings, exemplary embodiments of the present disclosure are described below. In the drawings for explaining the following exemplary embodiments, the same reference codes are allocated to elements (members or components) having the same function or shape and redundant descriptions thereof are omitted below.

First Exemplary Embodiment

A fixing belt 2 as an endless belt according to an exemplary embodiment is disposed in a fixing device 10 as illustrated in FIG. 1. The fixing device 10 includes the fixing belt 2, a heater 3, a pressure roller 4, a pressure pad 5, a stay 6, and a heating pipe 7. In the fixing device 10, a nip portion N is formed between the fixing belt 2 and the pressure roller 4. The fixing device 10 allows a recording sheet S as a recording medium with unfixed toner to pass through the nip portion N, thereby fixing toner on the recording sheet S.

The fixing belt 2 is formed in an endless shape (a loop), around the outside of the heating pipe 7. The fixing belt 2 is rotatably supported along both edges by flanges 9, such that the fixing belt 2 is rotated with rotation of the pressure roller 4. That is, the fixing belt 2 is not only heated by the heater but also presses the recording sheet S while being rotated, so that toner is fixed on the recording sheet S. A configuration of the fixing belt 2 is described in detail below.

The heater 3 is, for example, a halogen heater. The heater 3 is disposed on an inner side of the loop formed by the fixing belt 2 and the heating pipe 7 such that the fixing belt 2 is heated by radiant heat from the inner side via the heating pipe 7.

The pressure roller 4 is constructed of a metal roller and a silicone rubber layer as an elastic layer disposed on an outer circumference of the metal roller. Moreover, the pressure roller 4 includes a surficial fluorine resin layer, such as a perfluoroalkoxy (PFA) resin layer or a polytetrafluoroethylene (PTFE) layer, to provide releasability. The pressure roller 4 is rotated by driving force transmitted front a drive source such as a motor via a gear.

When the pressure roller 4 is pressed against the fixing belt 2, the elastic layer deforms. Accordingly, the nip portion N along the pressure pad 5 is formed between the fixing belt 2 and the pressure roller 4.

Although the pressure roller 4 can be a solid roller, the pressure roller 4 is preferably hollow to reduce heat capacity. Moreover, a heater such as a halogen heater can be disposed in the pressure roller 4 if the pressure roller 4 is a hollow tube.

The pressure pad 5 includes a contact surface that contacts the fixing belt 2. Such a contact surface is coated with, for example, diamond-like carbon, PTFE, molybdenum disulfide, or graphite to reduce a friction coefficient. On such a coated surface, lubricant such as silicone grease and fluorine grease is preferably applied. The application of lubricant can stabilize rotation of the fixing belt 2.

The heating pipe 7 is formed in a cylindrical shape. The heating pipe 7 is disposed on an inner side of the fixing belt 2 and supported internally by the stay 6. The heating pipe 7 functions as a guide when the fixing belt 2 is rotated.

Figure 2:
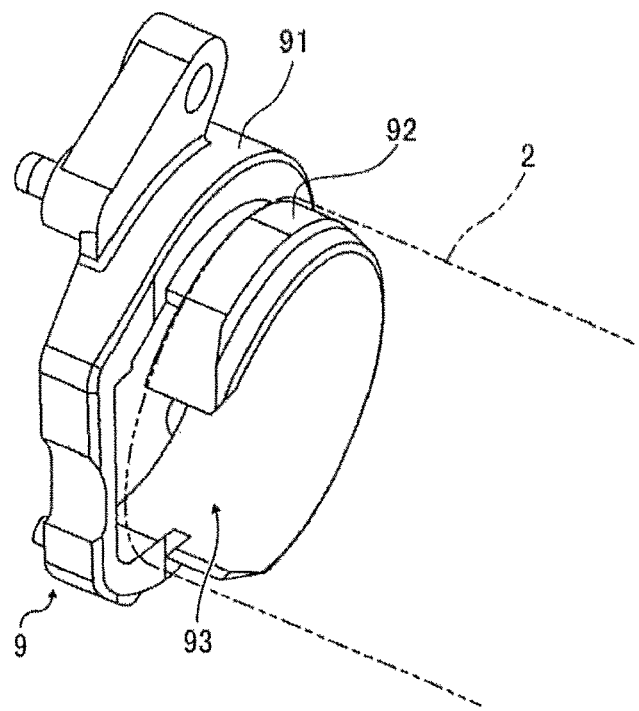
FIG. 2 is a schematic view illustrating a flange in the fixing device.

As illustrated in FIG. 2, the flange 9 is formed of a plate-shaped jaw 91 and a receiving portion 92. The receiving portion 92 projects from one surface side of the jaw 91 to extend along an axial direction of the fixing belt 2. Bach of die jaw 91 and the receiving portion 92 has a through-hole extending along the axial direction, and the flange 9 as a whole is hollow in shape. At the jaw 91, the flange 9 is attached to a side plate of the fixing device 10.

The receiving portion 92 is inserted into the inner side of the fixing belt 2 to guide rotation of the fixing belt 2. When the heating pipe 7 is disposed on the inner side of the fixing belt 2 as described above, the receiving portion 92 together with the heating pipe 7 guides the rotation of the fixing belt 2. The receiving portion 92 includes a notch 93 to have a C-shape view d in the axial direction, shaped to accommodate the pressure pad 5. The pressure pad 5 is disposed in the notch 93.

For example, an outer diameter of the receiving portion 92 decreases as the receiving portion 92 approaches the fixing belt 2. In a case in which the fixing belt 2 skews, the receiving portion 92 contacts an edge portion of the fixing belt 2 to correct movement of the fixing belt 2. For example, a ring-shaped slidable member can be disposed between the edge portion of the fixing belt 2 and the receiving portion 92. Such an arrangement can reduce friction generated between the fixing belt 2 and the receiving portion 92 when the fixing belt 2 is rotated.

When the recording sheet S passes through the nip portion N between the pressure roller 4 and the fixing belt 2 heated by the heater unfixed toner is fused and fixed on the recording sheet S.

Image Forming Apparatus Using the Above-Described Fixing Device

Figure 3:
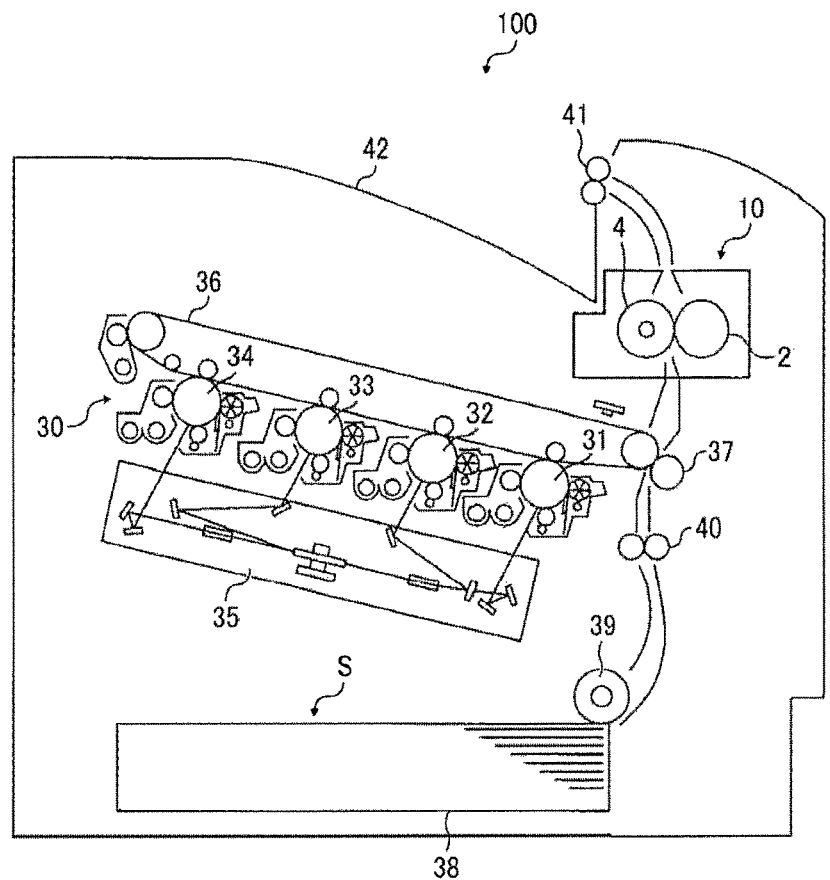
FIG. 3 is a sectional view schematically illustrating an image forming apparatus including the fixing device.

Next, an image forming, apparatus 100 using the above-described fixing device 10 is described with reference to FIG. 3.

The image forming apparatus 100 is a tandem-type color printer including a plurality of image formation units arranged side by side along a direction in which an intermediate transfer belt 36 is disposed. The image formation units form a plurality of images of respective color. The exemplary embodiment is not limited to the tandem type. The exemplary embodiment can be applied to a copier and a facsimile device in addition to the printer.

The image forming apparatus 100 includes the fixing device 10 and an electrophotographic image forming unit 30. The image forming unit 30 includes a photoconductor drum 31 for black, a photoconductor drum 32 for magenta, a photoconductor drum 33 for cyan, a photoconductor drum 34 for yellow, toner development units for the respective photoconductor drums 31 to 34, and transfer unit for the respective photoconductor drums 31 to 34.

Moreover, the image forming apparatus 100 includes an optical unit 35 that emits light based on image data input from an external unit. The optical unit 35 irradiates the photoconductor drums 31 through 34 with light to form latent images of the respective colors. Subsequently, the latent images are developed as toner images by the respective toner development units. Each of the toner images is transferred to the intermediate transfer belt 36 to form a color toner image, and then the color toner image is transferred to a recording sheet S by a transfer unit 37.

A recording sheet S is fed from a sheet feeding cassette 38 by a sheet feeding roller 39, and a registration roller 40 times conveyance of the recording sheet S to convey the recording sheet S to the transfer unit 37. In the transfer unit 37, a color toner image is transferred to the recording sheet S. Then, the recording sheet S with the transferred color toner image is conveyed to the fixing device 10. The recording sheet with the transferred toner image undergoes a toner image fixing process in which heat and pressure are applied by the fixing device 10. After the fixing process, the recording sheet S is ejected by a sheet ejection roller 41 to a sheet ejection tray 42 outside the image forming apparatus 100.

Fixing Belt

Next, the fixing belt 2 is described in detail with reference to FIGS. 4-6.

Figure 4:
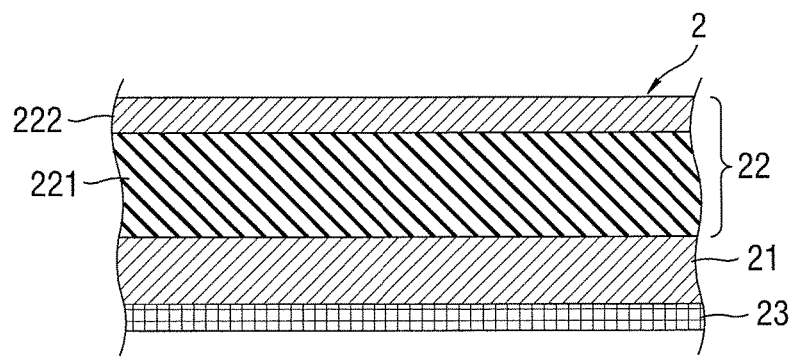
FIG. 4 is a sectional view illustrating the endless belt.

As illustrated in FIG. 4, the fixing belt 2 includes a base laves 21, a resin layer 22 laminated on the base layer 21, and an inside layer 23 disposed on the inner side of the base layer 21.

The base layer 21 is constructed of a metal film of a single layer made of an appropriate metal, for example, stainless or nickel. The base layer 21 has an appropriate thickness according to necessary strength or elasticity. The base layer 21 preferably has a thickness of between 25 µm and 50 µm, and more preferably has a thickness of between 30 µm and 45 µm.

The resin layer 22 includes an elastic layer 221 laminated on the base layer 21, and a release layer 222 laminated on the elastic layer 221. The elastic layer 221 is formed of silicon rubber, for example. The elastic layer 221 has an appropriate thickness according to various characteristics such as responsiveness with respect to roughness of toner and heat transferability. In the present embodiment, the elastic layer 221 preferably has a thickness of between 100 µm and 200 µm, and more preferably has a thickness of between 100 µm and 150 µm.

The release layer 222 is formed of fluorine resin such as PFA, PTFE, and tetrafluoroethylene hexafluoropropylene copolymer (FEP). The release layer 222 has an appropriate thickness according to various characteristics such as necessary durability, heat transferability, and responsiveness with respect to roughness of toner. The resin layer 22 preferably has a thickness of between 5 µm and 40 µm, and more preferably has a thickness of between 5 µm and 10 µm.

The inside layer 23 slides against the pressure pad 5. The inside laser 23 is formed of polyimide having good slidability or the aforementioned fluorine resin (e.g., PFA, PTFE, and FEP). The inside layer 23 has an appropriate thickness according to various characteristics such as necessary durability, heat transferability, and responsiveness with respect to roughness of toner. In the present embodiment, the inside layer 23 preferably has a thickness of between 5 µm and 30 µm, and more preferably has a thickness of between 10 µm and 20 µm.

Figure 5:
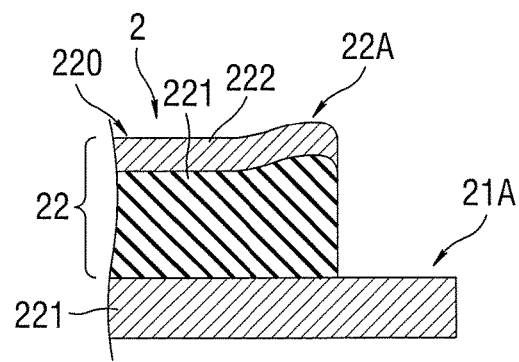
FIG. 5 is a sectional view illustrating an edge portion of the endless belt.

Herein, a description is given of the shape of an axial edge portion of the fixing belt 2 with reference to FIG. 5. The inside layer 23 is omitted in FIG. 5. Although FIG. 5 illustrates only one edge portion of the fixing belt 2, the other edge portion has a similar shape.

As illustrated in FIG. 5, an edge portion 22A of the resin layer 22 is recessed toward a middle portion 220 in an axial direction relative to the base layer 21, and an outer surface of the base layer 21 is exposed, so that an exposed portion 21A is formed. That is, the edge portion 22A is made narrower than the base layer 21 in the axial direction. The edge portion 22A is thicker than the middle portion 220 of the resin layer 22. Moreover, since the edge portion 22A rises relative to the middle portion 220, the edge portion 22A has a larger diameter. The exposed portion 21A preferably has a width (an axial width) of between 20 µm and 150 µm.

Figure 6:
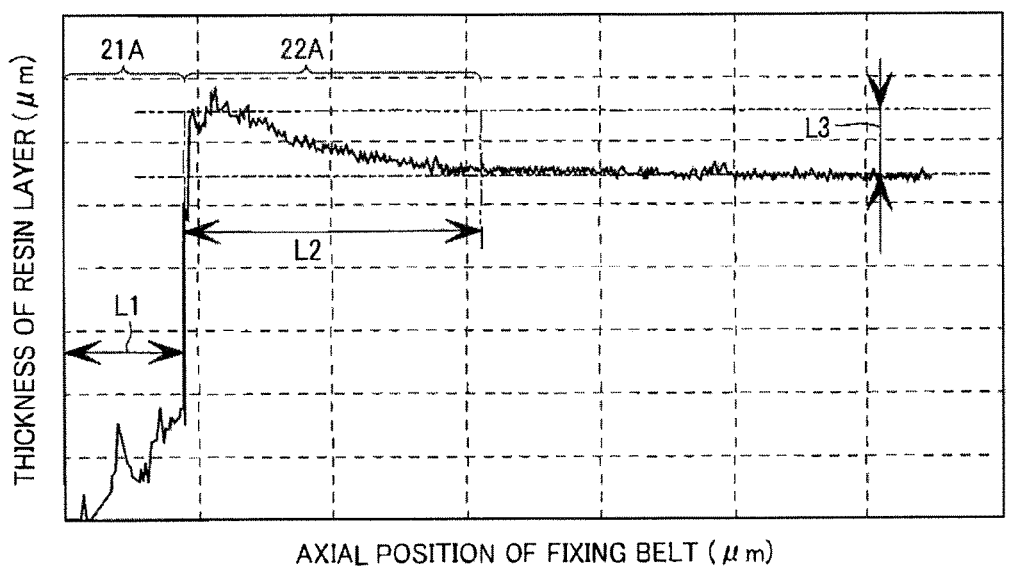
FIG. 6 is a graph illustrating an example of a resin layer thickness in the edge portion of the endless belt.

FIG. 6 illustrates an example of a thickness of the resin layer 22 in the axial edge portion of the fixing belt 2. In FIG. 6, a horizontal axis indicates an axial position of the fixing belt 2, and a vertical axis indicates a thickness of the resin layer 22. On the horizontal axis, an edge portion of the fixing belt 2 (an edge portion of the base layer 21) is zero. In the example illustrated in FIG. 6, L1 is approximately 45 µm, L2 is approximately 100 µm, and L3 is approximately 30 µm, where L1 is a width of a portion (the exposed portion 21A) in which a thickness of the resin layer 22 is substantially zero, L2 is a width of a portion that rises within the edge portion 22A, and L3 is a thickness of the rise of the edge portion 22A.

Figure 7:
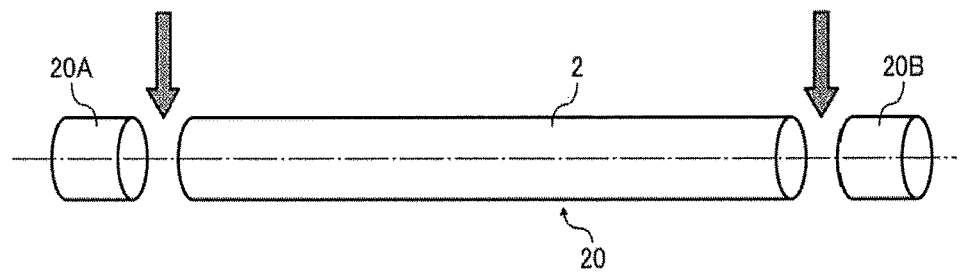
FIG. 7 is a side view illustrating an intermediate body of the endless belt.
Figure 8:
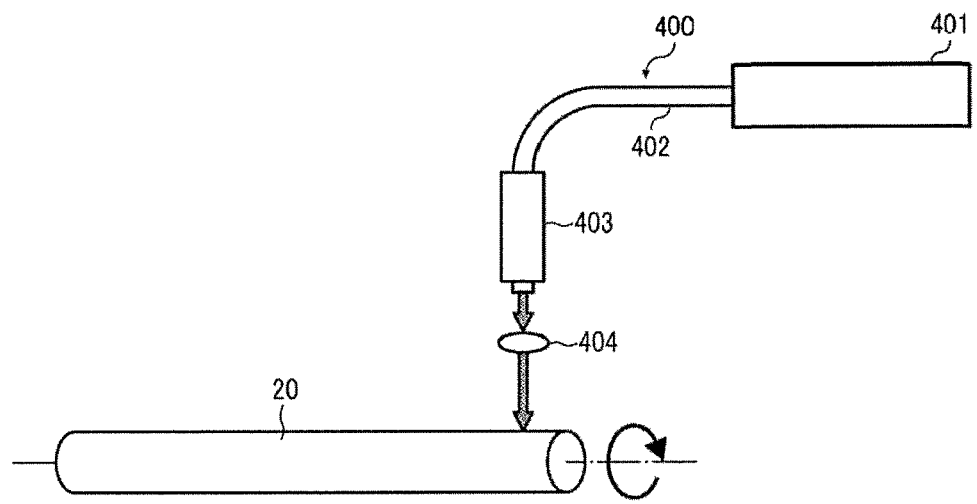
FIG. 8 is a side view schematically illustrating a state in which an edge portion of the intermediate body is out by a laser emitter.

Next, a method of manufacturing the fixing belt 2 is described, with reference to FIGS. 7 and 8.

First, the base layer 21 is formed by extrusion molding of a stainless material or nickel electroforming, and the elastic layer 221, the release layer 222, and the inside layer 23 are laminated on the base layer 21, thereby producing a cylindrical intermediate body 20 as illustrated in FIG. 7. Next, edge portions 20A and 20B of the intermediate body 20 are cut off, so that the intermediate body 20 has a desired length (an axial length).

In particular, as illustrated in FIG. 8, a laser emitter 400 as a cutter emits a laser to cut off the edge portions 20A and 20B while the intermediate body 20 is being rotated. For example, the laser emitter 400 is preferably a pulse wave fiber laser emitter with a fundamental wavelength of approximately 1064 nm. In the laser emitter 400, a laser oscillator 401 emits a laser beam toward a collimator 403 via a fiber 402, and the collimator 403 increases a diameter of the beam and generates parallel light rays. Subsequently, a process lens 404 condenses the light to obtain a desired diameter of the light spot, and the resultant light spot is directed onto the intermediate body 20.

A laser output is preferably 10 W or higher, and more preferably 20 W or higher. The use of such a laser output can shorten time necessary to cut the edge portions 20A and 20B. Moreover, the use of pulse wave laser instead of a continuous wave laser can reduce accumulation of excess heat in the intermediate body 20 irradiated with the light. Thus, a cut portion can be prevented from being damaged by heat, and a surface roughness of the cut portion can be reduced. Accordingly, polishing time in a next process can be shortened.

Moreover, the use of the pulse wave fiber laser emitter as the laser emitter 400 can reduce costs. The laser emitter 400 is not limited to such a laser emitter for example, a carbon dioxide ($CO_2$) laser emitter with a wavelength of approximately 10 µm, or any of various ultraviolet laser emitters can be used.

When the laser emitter 400 cuts off the edge portions 20A and 20B of the intermediate body 20, heat is generated. The resin layer 22 is shrunk by the heat, whereas the base layer 21 is barely shrunk. Hence, the outer side of the base layer 21 is exposed, so that the exposed portion 21A is formed. Meanwhile, the edge portion 22A of the resin layer 22 is recessed toward the middle portion 220 (an axial length of the resin layer 22 is decreased). That is, the laser emitter 400 also functions as a retraction unit. Moreover, when the resin layer 22 heat-shrunk, the edge portion 22A not only becomes thicker than the middle portion 220 in the axial direction of the resin layer 22, but also rises relative to the middle portion 220. Thus, a diameter of the edge portion 22A becomes larger than a diameter of the middle portion 220. Similar to the resin layer 22, the inside layer 23 is shrunk by heat and recessed.

After the edge portions 20A and 20B of the intermediate body 20 are cut off, edge surfaces of the cut base layer 21 are polished with polishing paper or an elastic grindstone to adjust a surface roughness to an appropriate value (e.g., 2 µm or less). When the surface roughness is adjusted, the manufacturing of the fixing belt 2 is completed.

According to such an exemplary embodiment, the following effects can be achieved.

Specifically, since the edge portion 22A of the resin layer 22 is made narrower than the base layer 21 in an axial direction, the resin layer 22 does not tend to interfere with other members (e.g., the flanges 9 for supporting both edges of the fixing belt 2) even if a belt skew occurs at the time of rotation of the fixing belt 2 in the fixing device 10. Thus, durability of the fixing belt 2 can be enhanced.

Moreover, the edge portions 20A and 20B of the intermediate body 20 are cut by the laser emitted from the laser emitter 400, and the resin layer 22 is shrunk by heat. With such shrinkage, the edge portion 22A can be readily recessed (can be shortened). That is, when a resin layer is formed, a masking process in not necessary to retract an edge portion. Thus, the number of manufacturing processes can be reduced. Moreover, since the laser emitter 400 as a cutter does not directly contact the intermediate body 20, the laser emitter 400 does not tend to be degraded even if cutting is repeated.

Moreover, the edge portion 22A is formed to have a higher density and a larger diameter than the middle portion 220 of the resin layer 22. Hence, in the fixing belt 2, the edge portion 22A tends to locally contact the recording sheet S, and does not tend to deform, thereby enhancing releasability. Moreover, even if the elastic layer 221 does not tend to deform in the edge portion 22A of the fixing belt 2, fixability of toner with respect to the recording sheet S is unlikely to be affected.

Second Exemplary Embodiment

Another exemplary embodiment is described with reference to FIG. 9. A fixing belt 2B of the exemplary embodiment includes a base layer 21, a resin layer 22 including an elastic layer 221 and a release layer 222, and an inside laser 23 as similar to the fixing belt 2 described in the above exemplary embodiment.

Figure 9:
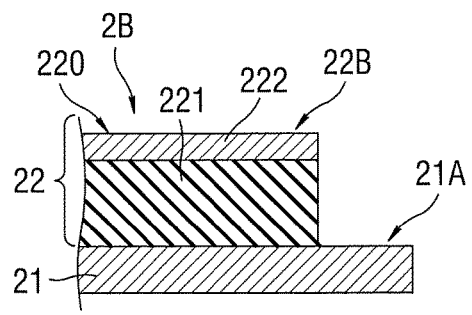
FIG. 9 is a sectional view illustrating an edge portion of an endless belt according to another exemplary embodiment.

As illustrated in FIG. 9, in an edge portion in an axial direction of the fixing belt 2B, an exposed portion 21A is formed on the base layer 21, and an edge portion 22B of the resin layer 22 is recessed (shorter than the base layer 21 in the axial direction). The edge portion 22B does not rise relative to a middle portion 220, and has a density substantially the same as a density of the middle portion 220.

Figure 10:
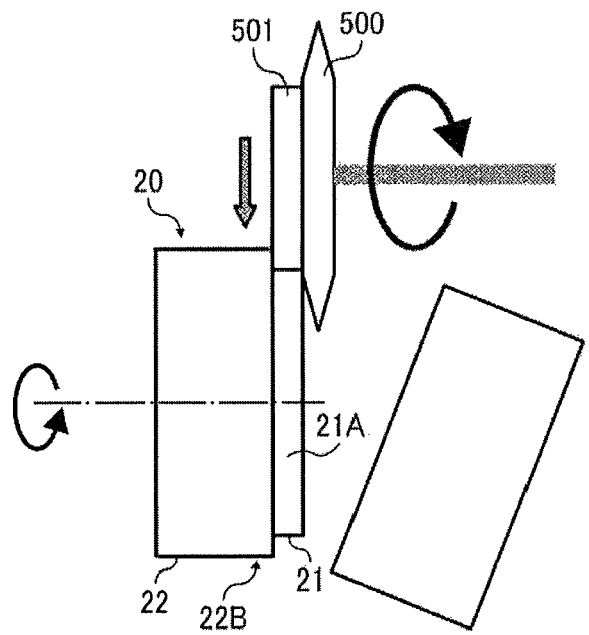
FIG. 10 is a side view schematically illustrating a state in which an edge portion of an intermediate body of the endless belt is cut by a rotary cutting blade.

Next, a method of manufacturing the fixing belt 2B is described. First, an intermediate body 20 is manufactured as similar to the above exemplary embodiment. Then, both edge portions of the intermediate body 20 are cut, so that the intermediate body 20 has a desired length (an axial length). Herein, as illustrated in FIG. 10, a rotary cutting blade 500 as a cutter and an elimination unit 501 as a retraction unit are used.

The elimination unit 501 is a disk-shaped grindstone member and disposed along a rotation axis direction with respect to the rotary cutting blade 500. Moreover, the elimination unit 501 has a smaller diameter than a diameter of the rotary cutting blade 500 according to a thickness of the resin layer 22, and a difference in the radiuses is substantially equal to the thickness of the resin layer 22. Moreover, the elimination unit 501 has a thickness (an axial size) according to a width of the exposed portion 21A to be formed.

When the intermediate body 20 is rotated, the rotary cutting blade 500 and the elimination unit 501 are also rotated. Such rotation allows rotation axes of the intermediate body 20 and the rotary cutting blade 500 to be substantially parallel to each other, so that the edge portion of the intermediate body 20 is cut by the rotary cutting blade 500. At the same time, the resin layer 22 is scraped from an outer circumference side by the elimination unit 501, and a recessed edge portion 22B is formed.

According to the exemplary embodiment, the edge portion 22B of the resin laser 22 is made narrower than the base layer 21 in the axial direction, as similar to the above exemplary embodiment. Accordingly, the resin layer 22 does not tend to interfere with other members even if a belt skew occurs, thereby enhancing durability of the fixing belt 2B.

Moreover, the edge portion 22B is recessed (shortened) by the elimination unit 501 while the axial edge portion of the intermediate body 20 is being cut by the rotary cutting blade 500. Thus, a process for retracting the edge portion 22B can be eliminated.

Third Exemplary Embodiment

Another exemplary embodiment is described with reference to FIG. 11. A fixing belt 2C of the exemplary embodiment includes a base layer 21, a resin layer 22 including an elastic layer 221 and a release layer 222, and an inside laser 23 as similar to the fixing belt 2 and the fixing belt 2B described in the above exemplary embodiments.

Figure 11:
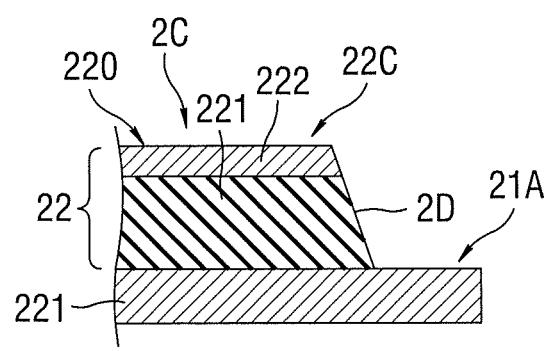
FIG. 11 is a sectional view illustrating an edge portion of an endless belt according to another exemplary embodiment.

In an edge portion in an axial direction of the fixing belt 2C as illustrated in FIG. 11, an exposed portion 21A is formed on the base layer 21, and an edge portion 22C of the resin layer 22 is retraced (made narrower than the base layer 21 in the axial direction). The edge portion 22C does not rise relative to a middle portion 220, and has a density substantially the same as a density of the middle portion 220. Moreover, an edge surface 22D of the edge portion 22C is inclined such that an outer diameter of the edge surface 22D increases as the edge surface 22D approaches the outer side.

Figure 12:
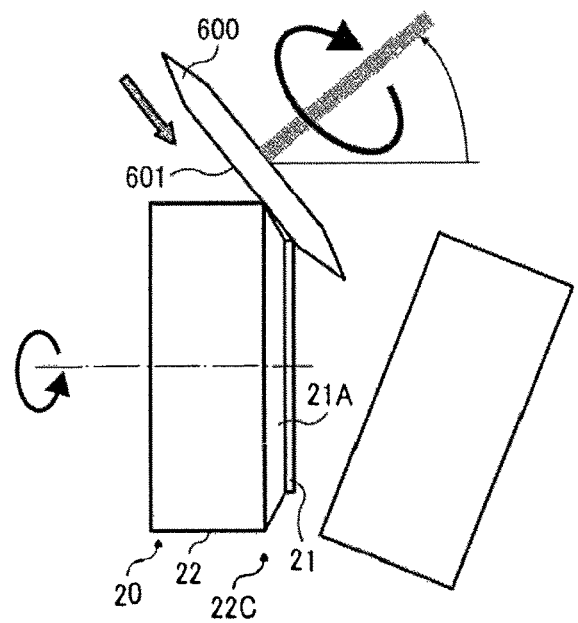
FIG. 12 is a side view schematically illustrating a suite in which an edge portion of an intermediate body of the endless belt is cut by a rotary cutting blade.

Next, a method of manufacturing the fixing belt 2C is described. Similar to the above-described exemplary embodiments, an intermediate body 20 is first manufactured. Then, both edge portions of the intermediate body 20 are cut, so than the intermediate body 20 has a desired length (an axial length). Herein, as illustrated in FIG. 12, a rotary cutting blade 600 as a cutter is used. The rotary cutting blade 600 as a whole is formed of a grindstone member. A circumferential edge of the rotary cutting blade 600 functions as a cutting blade, whereas a side surface of the rotary cutting blade 600 functions as a grindstone portion 601 as an elimination unit.

A rotation axis of the rotary cutting blade 600 is inclined with respect to a rotation axis of the intermediate body 20, and the intermediate body 20 and the rotary cutting blade 600 are rotated. Accordingly, an edge portion of the intermediate body 20 is cut by the rotary cutting blade 600. At the same time, the resin layer 22 is scraped at a slant from an outer circumference side by the grindstone portion 601 of the side surface of the rotary cutting blade 600, so that a recessed edge portion 22C is formed.

According to the exemplary embodiment, the edge portion 22C of the resin layer 22 is made narrower than the base layer 21 in the axial direction as similar to the above exemplary embodiments. Accordingly, the resin layer 22 does not tend to interfere with other members even if a belt skew occurs, thereby enhancing durability of the fixing belt 2C.

Moreover, since the edge portion 22C is recessed (shortened) while the axial edge portion of the intermediate body 20 is being cut by the rotary cutting blade 600, a process for retracting the edge portion 22B can be eliminated. Moreover, the rotary cutting blade 600 as a whole is formed of a grindstone member, and the grindstone portion 601 is formed on a sale surface of the rotary cutting blade 600.

Thus, cutting and elimination can be performed by a single member of the rotary cutting blade 600.

The present disclosure is not limited to each of the above exemplary embodiments. The preset disclosure includes not only other configurations by which an object of the present disclosure can be achieved, but also modifications as follows.

For example, in each of both edge portions in an axial direction of the fixing belt 2 according to the first exemplary embodiment, an edge portion 22A of the resin layer 22 is made narrower than the base layer 21 in the axial direction. However, an edge portion of a resin layer can be made narrower in only one edge portion in the axial direction. In a case in which a belt skew toward one side in the axial direction lends to occur at the time of rotation of the fixing belt 2 in the fixing device 10, only an edge portion on such a side can be shortened to obtain an advantage similar to the advantage obtained by the first exemplary embodiment.

Figure 13:
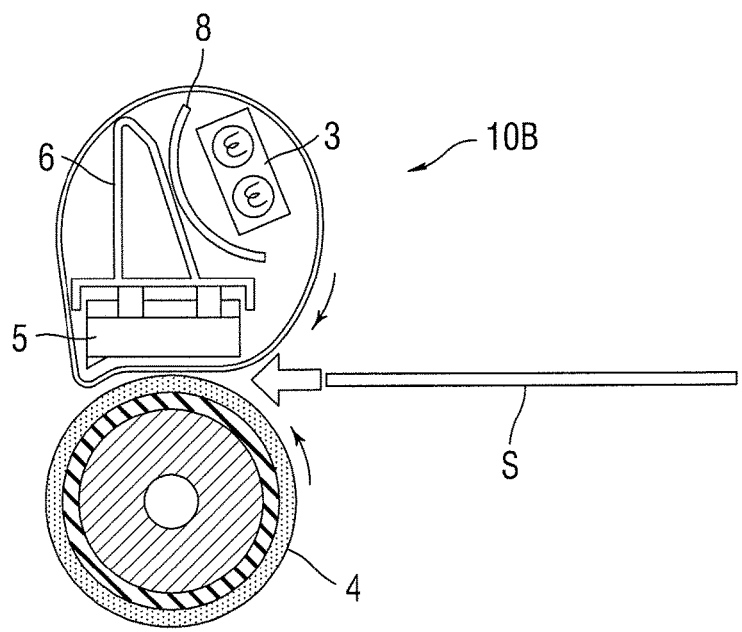
FIG. 13 is a sectional view illustrating a modification of a fixing device including an endless belt.

Moreover, the first exemplary embodiment has been described using an example case in which the fixing device 10 includes the heating pipe 7 on an inner side of the fixing belt 2 to heat the fixing belt 2 via the heating pipe 7. However, the fixing belt 2 may be used in a fixing device having another shape or employing another method. For example, as illustrated in FIG. 13, the fix my belt 2 can be used in a fixing device 10B in which a heating pipe 7 is not disposed. In such a case, the fixing belt 2 is directly heated by a heater 3. The fixing device 10B includes a reflection plate 8 that reflects light from the heater 3 as a halogen heater toward the fixing belt 2.

Moreover, the heater 3 is not limited to the halogen heater. The heater 3 may be a ceramic heater or a carbon heater. Alternatively, the heater 3 may be a resistance heater that heats the fixing belt 2 by contacting the fixing belt 2 or an induction heater (IH) that heats metal (the base layer 21) of the fixing belt 2 by using an alternating field.

Moreover, the fixing belt 2 may not be cylindrically supported by a member such as a flange. The fixing belt 2 may be used in a fixing device including a plurality of rollers. In such a case, the fixing belt 2 can be looped around the plurality of rollers.

In the above first exemplary embodiment, the edge portion 22A of the fixing belt 2 as an endless belt (a belt to be heated) is made narrower than the base layer 21 in an axial direction. However, in a fixing device in which a pressure side includes an endless belt, an edge portion of the endless belt of the pressure side may be made narrower.

Figure 14:
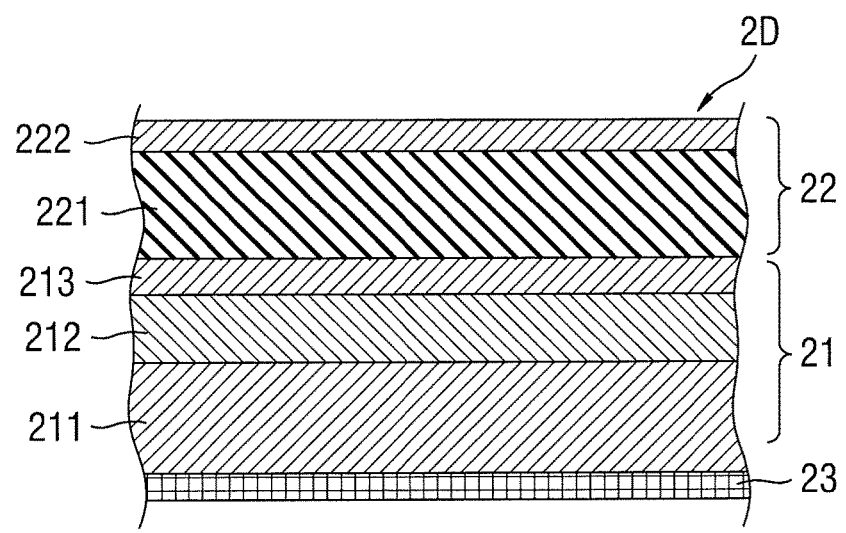
FIG. 14 is a sectional view illustrating a modification of an endless belt.

Moreover, the first exemplary embodiment has been described using an example case in which the base layer 21 is constructed of a metal film of a single layer. However, the base layer 21 may be constructed of a plurality of metal films. For example, in a fixing belt 2D as illustrated in FIG. 14, a base layer 21 can be constructed of a nickel layer 211, a copper layer 212, and a protective layer 213 made of nickel, and the nickel layer 211, the copper layer 212 and the protective layer 213 can be laminated in this order from the inner side. Accordingly, heat conductivity of the base layer 21 can be enhanced by the copper layer 212. Moreover, since the nickel layer 211 and the protective layer 213 do not tend to be oxidized, oxidation of the copper layer 212 can be prevented when the fixing belt 2D is stored.

The present disclosure has been described above with reference to specific exemplary embodiments but is not limited thereto. Various modifications and enhancements are possible without departing from scope of the disclosure. It is therefore to be understood that the present disclosure may be practiced otherwise than as specifically described herein. For example, elements and/or features of different illustrative exemplary embodiments may be combined with each other and/or substituted for each other within the scope of the present disclosure.

Therefore, the foregoing shapes and materials are illustrative only for the sake of clarity, and the present disclosure is not limited thereto. The present disclosure should include name of a member from which a part of or all of limitations of the foregoing shape or material are removed.

What is claimed is:

1. A fixing device comprising:
   an endless belt comprising:
      a base layer including a metal film; and
      a resin layer laminated on an outer side of the base layer and including edge portions in an axial direction with at least one edge portion of the edge portions made narrower than the base layer in the axial direction such that the outer side of the base layer is exposed,
      wherein the at least one edge portion rises relative to a middle portion of the resin layer in the axial direction; and
   a heater to fuse toner onto a recording medium when the endless belt is rotated while pressing against the recording medium.

2. The fixing device according to claim 1, wherein the at least one edge portion is thicker than a middle portion of the resin layer in the axial direction.

3. The fixing device according to claim 1, further comprising an inside layer formed on an inner side of the base layer,
   wherein the resin layer includes an elastic layer.

4. An image forming apparatus comprising:
   an image forming unit to form a toner image on a recording medium; and
   the fixing device according to claim 1, to fix the toner image on the recording medium.

5. A fixing device comprising:
   a fixing belt comprising:
      a base layer including a metal film; and
      a resin layer laminated on an outer side of the base layer and including edge portions in an axial direction with at least one edge portion of the edge portions made narrower than the base layer in the axial direction such that the outer side of the base layer is exposed;
   a heater to heat the fixing belt; and
   a pressure roller to rotate with the fixing belt to press against a recording medium,
   wherein the at least one edge portion rises relative to a middle portion of the resin layer in the axial direction.

6. The fixing device according to claim 5, wherein the heater is disposed on an inner side of the fixing belt to heat the fixing belt with radiant heat.

7. The fixing device according to claim 5, further comprising a pressure pad disposed on an inner side of the fixing belt to form a fixing nip.

8. The fixing device according to claim 7, wherein the fixing belt includes an inside layer that is formed on an inner side of the base layer and slides against the pressure pad, and
   wherein the resin layer includes an elastic layer.

9. An image forming apparatus comprising:
   an image forming unit to form a toner image on a recording medium; and
   the fixing device according to claim 5 to fix the toner image on the recording medium.

10. A method of manufacturing an endless belt, the method comprising:

laminating a resin layer on an outer side of a base layer including a metal film;
cutting edge portions of the base layer and the resin layer in an axial direction of the endless belt with a cutter;
making at least one edge portion of the edge portions of the resin layer narrower than the base layer in the axial direction such that the outer side of the base layer is exposed; and
shrinking the at least one edge portion of the resin layer with heat generated during cutting of the base layer and the resin layer with a laser emitter as the cutter.

* * * * *